US007668859B2

(12) United States Patent (10) Patent No.: US 7,668,859 B2
Streetman (45) Date of Patent: Feb. 23, 2010

(54) METHOD AND SYSTEM FOR ENHANCED WEB SEARCHING

(76) Inventor: Foy Streetman, P.O. Box 2231, Chickasha, OK (US) 73023-2231

( * ) Notice: Subject to any disclaimer, the term of this patent is extended or adjusted under 35 U.S.C. 154(b) by 258 days.

(21) Appl. No.: 11/379,095

(22) Filed: Apr. 18, 2006

(65) Prior Publication Data

US 2007/0244858 A1 Oct. 18, 2007

(51) Int. Cl.
*G06F 7/00* (2006.01)
*G06F 17/00* (2006.01)
*G06F 3/00* (2006.01)
(52) U.S. Cl. .................. 707/102; 707/104.1; 715/712
(58) Field of Classification Search ............... 707/102, 707/6; 704/251; 715/827
See application file for complete search history.

(56) References Cited

U.S. PATENT DOCUMENTS 6,151,624 A * 11/2000 Teare et al. ................. 709/217

| 2002/0194300 | A1 | 12/2002 | Lin et al. |
| 2003/0078777 | A1* | 4/2003 | Shiau .......................... 704/251 |
| 2005/0043940 | A1* | 2/2005 | Elder ............................ 704/9 |
| 2005/0091274 | A1 | 4/2005 | Stanford |
| 2005/0192999 | A1* | 9/2005 | Cook et al. ................. 707/102 |

* cited by examiner

*Primary Examiner*—Apu M Mofiz
*Assistant Examiner*—Susan Y Chen
(74) *Attorney, Agent, or Firm*—R. William Graham (57) ABSTRACT

A system for user-directed acquisition over a wide area network includes a client computer, a database having information data relating to user-entered text of HTML pages, and a server computer having a program software stored on the storage device to receive a user-entered word data in a first language from the client, to receive a user-entered geographic search area data from said client, and wherein the program software is associated with software for generating a translation language pair data and for translating the word data in accordance with the language corresponding to the user entered geographic search area data, software for accessing said information data as a function of the translated word data, and software for transmitting the accessed information data to the client-computer. A method is also provided.

16 Claims, 5 Drawing Sheets

METHOD AND SYSTEM FOR ENHANCED WEB SEARCHING

FIELD OF THE INVENTION

This invention relates to a system and method for enhanced web searching and communication. More particularly, the invention enables acquiring information relating to specific user-entered data from World Wide Web site pages as a function of specific geographic regions and language emanating therefrom.

BACKGROUND

World Wide Web sites ("web sites") can be provider-driven or consumer-driven. The provider-driven system can post content in a language, and holds itself out to the consumer using untargeted or generalized consumer data. The consumer-driven system seeks out the seller using real or targeted consumer data.

Web sites can include passive and active formats. A passive site provides information about the content/product in a language (e.g., English) and directs consumers to places where they can obtain the content/product.

An active site provides information as well as permits the consumer to communicate and conduct a transaction over a network, e.g., the Internet, to obtain information or to purchase a product/service. This information is commonly presented and accessed in a single language on a given site.

Conducting web based searches for a specific product, service or information can be a time-consuming process. This process is compounded when trying to conduct searches for information world wide. When attempting to communicate or search globally, a consumer may fail to obtain desired information, or complete a product-related transaction if such consumer does not understand the language over the site.

Today, close to a billion Internet users will access and provide web pages in a multitude of languages. There are currently many approaches to globalization of commercial web sites including web language to language translation dictionaries. Some companies provide expensive full text translation in many languages for their sites, but this is not viable for most companies.

Consequently, consumers can become quickly disenchanted with search results with little control over the nature and amount of content provided in response to their particular search query. Current approaches, do not easily address the globalization problems for businesses with commercial web pages that post content and/or transact in a single language format.

Translation resources render the obtained information useful and some prior approaches in the art have been employed to aid the client/consumer in translation. One product allows a client to customize definitions of particular words and phrases that occur on a web page requiring one to leave the web page to obtain the definition from a source. Another provides limited translation of user-selected words but is not integrated into providers' web pages and requires downloaded software to be resident and executable on the client side.

In many instances, the consumer would need to exit the viewed page and spend considerable time using the reference information to make the information useful and thus has a negative impact to the user. After exiting the page, there is a high likelihood that the potential consumer will never return to the page having been effectively deterred by the tasks of translation.

One system contemplates using a client-side Web browser, wherein a user selects a desired text by copying the text from a Web page, and pasting it to a text field in a reference window that is integrated into the Web page, and that is linked to an information retrieval function. The user can select from a plurality of reference sources and/or translation language pairs whereby the user-selected reference source or user-selected translation language pair is accessible by the information retrieval function. The reference sources include dictionaries. For example, the user preference for a particular translation language pair is selected using a scrollable language pair field of a linked dictionary window.

The information relating to user-selected text of World Wide Web site pages consists of high quality multi-lingual translations, explanations, or consolidated automatic multi-dictionary definitions, wherein such information is displayed to the user in text, voice, image or multi-media formats. The information retrieval function includes an Internet search engine operative with the information retrieval function to search the Internet in accordance with the user-selected text, and the user-selected reference source or user-selected translation language pair, whereby the information retrieval function is augmented. While this attempt appeared to be a step in the right direction, the search potentially returns many irrelevant web pages.

There remains a continued need to improve web searching and communication tools so that the consumer can reach a more global market base in a more user defined manner which sifts out unwanted sources of information. An improved tool is needed to enable websites to effectively communicate information to a potential consumer/client, as opposed to misdirecting over-inclusive information to the consumer/client and unnecessarily transmitting data due to an overly inclusive search query in a plurality of languages, i.e., and traffic management.

Therefore, there is a need in the art for cost-effective methods of high quality globalization of commercial web sites. There is a need in the art to render HTML pages obtained over the Internet more accessible and responsive to the multi-lingual characteristics of users. There is a need in the art for methods of web site searching and communication over the Internet using improved techniques. There is a need in the art to reduce the amount of client-side processing involved with conducting searches.

SUMMARY OF THE INVENTION

An object of the present invention is to improve web searching and communication tools.

Another object of the present invention is to enable websites to effectively communicate information to a potential consumer/user.

Yet another object of the present invention is to reduce unnecessary data transmission of misdirected over-inclusive information to the consumer/client, i.e., improve network traffic management.

Still another object of the present invention is to prevent an overly expansive search query.

Another object of the present invention is to render pages obtained over the Internet more accessible and responsive to the multi-lingual characteristics of users.

Yet another object of the present invention is to provide a user defined key word search as a function of a geographic region and language emanating therefrom.

A further object is to provide a search engine which dynamically obtains a language pair based on a given native language and a user entered geographic search area and translates to the language of the geographic search area, and retrieves information, preferably emanating from that geographic search area.

Accordingly, the present invention is directed to a system and method which provide a more effective web communication or searching not heretofore attained. The method of enhanced web communication and searching includes: operably associating program software with a computer based device which is operably connected to a network, such as the Internet, wherein the program software enables a user to input through the computer based device key word data which is accessible by an information retrieval function of the program software, enables the user to enter a particular geographic search area data whereby a translation language pair data is generated, providing a reference data source associated with the translation pair data for enabling translation of the key word data into a translated key word data, whereby the translated key word data is accessible by the information retrieval function in a manner to retrieve information data over the Internet as a function of the language of the geographic search area data and preferably the information emanating from the geographic search area.

The method includes inputting the key word data of a first language into the computer based device, and entering into the computer based device the geographic search area data whereby a translation language pair is generated including the first language and a second language and a translation is provided using the second language, employing the information retrieval function with respect at least the word data and the geographic area search data to obtain over the Internet information data, translating the information data into the first language using the reference source data and displaying to the same. Optionally, the method enables entering into the computer based device the translation language pair data after a the geographic area search data having an associated reference translation source The method can be further characterized such that the program software includes search engine software.

The search engine software can be integrated into a server-side web site by either incorporating into the site a reference window linked to the information retrieval function, or via linked a pull down/pop up menu, or by installing programmed script on all web pages of the site to link and enable the information retrieval function. Optionally, the method steps can be integrated into a client-side system using downloadable software, or a browser plug-in that is linked to the information retrieval function.

The entering of a key word can be achieved by either typing or pasting a copied word into a window linked to an information retrieval function, or by highlighting the word whereby such highlighting renders the user-selected word accessible by an information retrieval function. The method can include translation language pair data having an associated language to language conversion dictionary (reference source data) for a given language pair. Such reference source data can include one or more dictionaries, such as information relating to user-selected text of World Wide Web site pages consists of high quality multi-lingual translations, explanations, or consolidated automatic multi-dictionary definitions, wherein such information can be displayed to the user in various formats known in the art.

An alternate embodiment provides a method, over a wide area network including a server and a client, for client-directed acquisition of information relating to client-entered text data, comprising: receiving from the client-entered text data in a first language; receiving from the client-entered geographic search area data and employing means for generating a translation language pair data including the first language and a second language corresponding to the geographic search area data and having an associated translation reference source data for such language pair; employing means for translating the text data into the second language using a translation reference data source; accessing over the network information relating to the translated text data, translating the accessed information into the first language; and transmitting to the client the accessed information data. Preferably, the method further comprises an Internet search engine operative with server to perform the search over the Internet.

An additional embodiment provides a system for user-directed acquisition over a wide area network comprising a server and a client. The system comprises: a client, a database having information relating to user-entered text of HTML pages, and a server connected to the network, wherein the server comprises a processor, a memory, and a storage device, and wherein the processor and memory are operative with a program stored on the storage device to receive from the client a user-entered word data in a first language and a user-entered geographic search area data, wherein the program has means for generating a translation language pair data and for translating the word data in accordance with the language corresponding to the geographic search area data, means for accessing information data as a function of the translated word data, and means for transmitting the accessed information data to the client-side user.

In addition to LAN, WAN networks, it is also contemplated that a system and method can be employed over a wireless network comprising a server side (e.g., WAP-based) and a client side (e.g., cellular phones, or other PDA wireless devices, such as Palm PC, Pocket PC, PSION, etc.), for user-directed acquisition of real-time translation as a function of the geographic search area. The communication can take place in various data forms or voice-to-text, voice-to-voice, text-to-voice and text-to-text translations.

DETAILED DESCRIPTION OF THE INVENTION

Referring now to the drawings, the system and method for enhanced web communication and searching of the present invention is generally referenced by the numeral 10. The invention can be deployed over various networks, including LAN, WAN, and WAP applications, for example. The present invention affords a unique improvement to conventional web searching applications providing a more user-friendly multi-lingual functionality.

The system 10 and method provide improvement by which more relevant HTML pages, web pages, are accessed by a global consumer/client/user base communicating in one or more native languages and native character sets. In one instance, the system 10 and method include a server 12 connected to a network, such as the Internet 14, and a client 16 can be connected via the Internet 14, or an Intranet, for user-directed acquisition of information relating to user data 18. It is contemplated that various computer-based platforms can be used to carry out the invention and that the server-client described is intended to describe the functionality performed. The server 12 and client 16 are preferably computer-based devices, wherein the client may have less function than the required for the server to carry out the invention.

Figure 4:
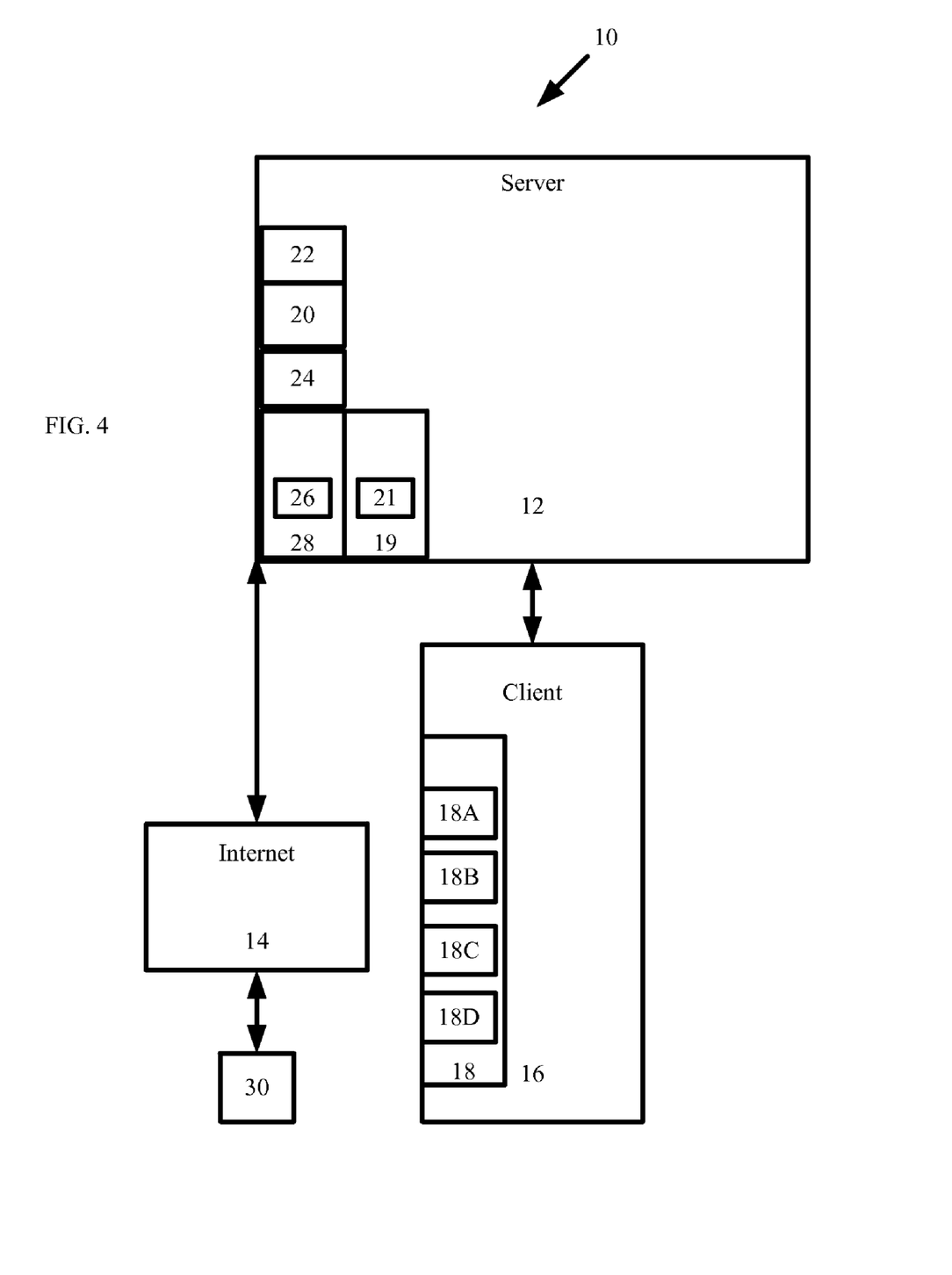
FIG. 4 is a schematic showing the invention.

The server 12 includes a processor 20, a memory 22, and a storage device 24, wherein the processor 20 and memory 22 are operative with a program 26 stored on a storage device 28 (which can be resident on the server 12 or remotely located on another computer based device) to receive a user-entered word data 18A, to receive a user-entered geographic search area data 18B, to provide a translation language pair data 18C and reference source data 18D for use in translating word data 18A in accordance with the translation pair data 18C as a function of geographic search area data 18B. It is contemplated that the translation pair 18C and the reference source data 18D can be user entered. The program 26 is illustrated in a web page in FIG. 4.

The geographic search area data 18B provides for the program 26 to automatically predetermine one or more potential language pairs with the ability of the user to select the desired pair. The program 26 is also equipped to permit the user to select the particular language pair 18C at this point or provides for further selection of more specific geographic search area data 18B for purposes of further specifying the language pairs, wherein the program 26 populates using the more specific geographic search area data to provide the language pair data 18C. The program 26 accesses information data 30 (which can be stored on a remote computer based device) relating to the user-entered key word data 18A as a function of using the data 18B, 18C and 18D. The program 26 uses the reference source data 18D to translate the information data 30 into the native language and transmits the accessed information data 30 relating to the client 16. The program 26 can include an Internet search engine, with an information retrieval software function, operative with the server 12 to search the Internet 14 as described herein.

An alternate embodiment provides a method over a wide area network which includes server 12 and a client 16, for user-directed acquisition of information relating to user-entered key word data 18A. The method includes the steps of receiving from the client 16 user-entered key word data 18A; receiving from the client 16 user-entered geographic search area data 18B; using a translation language pair data 18C; using reference source data 18D; accessing information data 30 relating to the user-entered key word data 18A as a function with the user-entered geographic search area data 18, translation language pair data 18C and reference source data 18D; and transmitting to the client 16 the accessed information data 30 relating to the user-entered key word data 18A. Preferably, the method further comprises an Internet search engine software 19 operative with server 12 to search the Internet 14 in accordance with the user-entered key word data 18A, the user-entered geographic search area data 18B, user-entered translation language pair data 18C and reference source data 18D.

It is also contemplated that a system 10 and method can be employed over a wireless network comprising a server side (e.g., WAP-based) and a client side (e.g., cellular phones, or other PDA wireless devices, such as Palm PC, Pocket PC, PSION, etc.), for user-directed acquisition of real-time translation, geographic search area data and reference services (including voice-to-text, voice-to-voice, text-to-voice and text-to-text translations and reference services) in both text and voice, using standard cellular phones and PDA devices. Communication proceeds between a "master" user, having a subscribing wireless device (e.g., phone) and a "slave" user which can be another wireless device accessible by the master device.

Another aspect of the invention is directed to a method of enhanced web searching which includes operably associating search engine software 19 with a computer based device 12 which is operably connected to the Internet 14, wherein the search engine software 19 includes software for enabling a user to input through the computer based device 16 a key word data 18A which is accessible by an information retrieval function 21 of the search engine software 19, and enabling the user to enter a particular geographic search area data 18B, providing means for generating a translation language pair data 18C having a reference source data 18D for enabling translation of the key word data, whereby the data 18A, 18B, 18C and 18D are accessible by the information retrieval function software 21.

Further, the method provides inputting the key word data 18A into the computer based device 16, entering into the computer based device 16 the translation language pair data 18C and entering into the computer based device 16 the geographic search area data 18B, employing the information retrieval function software 21 as a function of each said data 18A, 18B, 18C, 18D to access and obtain over the Internet 14 sought restricted information data 30 related to the key word data 18A and displaying to the same. More specifically, accessing the information is a function of restricting the retrieval of information data 30 as a function of the translated word data per the geographic search area data 18B. The method can be further characterized such that the search engine software 19 enables translation of the key word data 18A corresponding to the entered translation pair data 18C and the sought information data 30. Optionally, the method can characterized to enable entering user-entered reference source data 18D, whereby the user-entered reference source data 18D is accessible by the information retrieval function software 21 and used in obtaining the sought restricted information data 30.

The search engine software 19 can be integrated into the server 12 web site 23 by either incorporating into the web site 23 a reference window linked to the information retrieval function software 21, or linked pop-up and pull down menus, or by installing programmed script on all web pages of the web site 23 to link and enable the information retrieval function software 21. Optionally, the method steps can be integrated into the client 16 using downloadable software, or a browser plug-in 25 that is linked to the information retrieval function software 21. The information retrieval function software 21 can include one or more linked servers with one or a more of processors, memory, and storage devices operable programmed and configured to carry out the information retrieval function software 21.

The entering of key word data 18A can be achieved by either typing or pasting a copied word into a window 27 linked to information retrieval function software 21 (or by highlighting the word when reading a page, for example, whereby such highlighting renders the user-selected word accessible by information retrieval function software 21). Further, translation language pair data 18C can be selected by an expanding menu of language pairs 29 (wherein this pair can include pair can be linked to a language to language conversion dictionary 18A). Also, the entering of geographic search area data 18B can be achieved by clicking on a part of a world map 31, which in turn can preferably automatically populate the language pair data 18C using the selected geographical area data 18B. In the case of multiple languages, the user can click on a more particular map portion 33, here locating a particular country or region, and thereby automatically populating the language pair data 18C. Thus, the geographic search area data 18C can be used to not only pre-populate the translation pair data 18C, but also restrict the retrieved information data 30 to the particular geographical area data 18B. For example, if an English speaking user wishes to explore restaurants in Greece, the user can simply click on Europe, then Greece and the translation pair English-Greek will be populated and the information retrieval function software 21 can retrieve information data 30 in accordance with the Greek translation of "restaurant" and limit the geographic search area to Greece.

The system 10 can be implemented using a plurality of clients 16 receiving messages in one or more translated languages. The users may retrieve information related to selected voice or text data. Such related information includes multilingual translation as a function of user-entered geographic search area data or gps predetermined geographic search area data. Thus, in the case of using mobile technology, the program 26 can automatically translate to the user requested key word data 18A based upon the device's gps location or allow the user to enter the geographic search area data 18B. In this way, when traveling in Sweden, for example, English entered word data are translated into Swedish based upon the devices known gps location. The information data 30 can displayed to the user in text, voice, image or multi-media formats that are compatible with the user's wireless device, and with the user's native language or character set by using high quality multi-lingual translations, explanations, illustrations and/or consolidated automatic simultaneous multi-dictionary definitions ("look-ups") reference source data 18D. The invention thus allows for a more user friendly web search and communication tool not heretofore obtained.

Using the inventive system and method, a user connects to a Web site from their client computer (internet compatible PDA or other cellular or hand-held device). The inventive system and method achieve their efficiency, at least in part, by enabling a user to acquire reference information related to specific Web site text in the absence of full-text machine or human translation. Additional efficiency is gained, in preferred embodiments, where the method is integrated into a server-side web site, by either incorporating into the site a reference window or pull down menus linked to the inventive information retrieval function 21, or by installing programmed script on all web pages of the site to link and/or enable the information retrieval function. In alternate embodiments, the method steps are integrated into a client-side system using downloadable software or browser plug-ins that link user-selected text and preferences to the information retrieval function. Other input means such as right-clickable "pop-up" menus are also encompassed by the present invention, and are familiar in the art.

Preferably, such information transmittal is in the user-selected translation language, which can be the user's native language. The memory element of the information retrieval function can include an extensive collection of dictionaries and reference books to enable retrieval of related information using a variety of languages throughout the world and Web.

Figure 1:
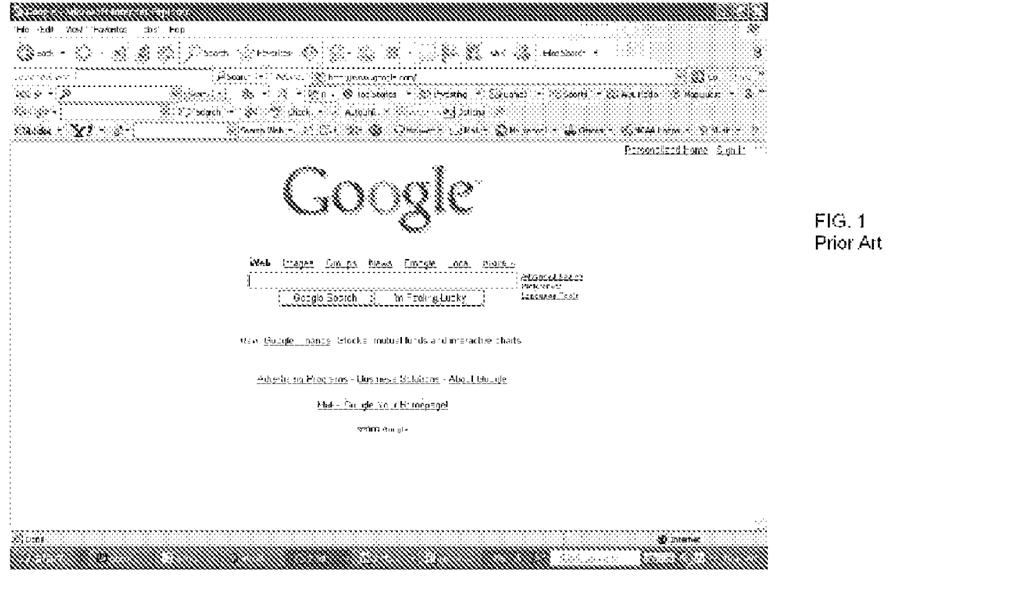
FIG. 1 is a screen shot of a typical Internet search Web page for GOOGLE®, illustrating the prior art.

FIG. 1 illustrates prior art search engine "Google™" which is a tool for finding resources on the World Wide Web. Google scans web pages to find instances of the keywords a user enters in the search box and returns results to the user.

Figure 2:
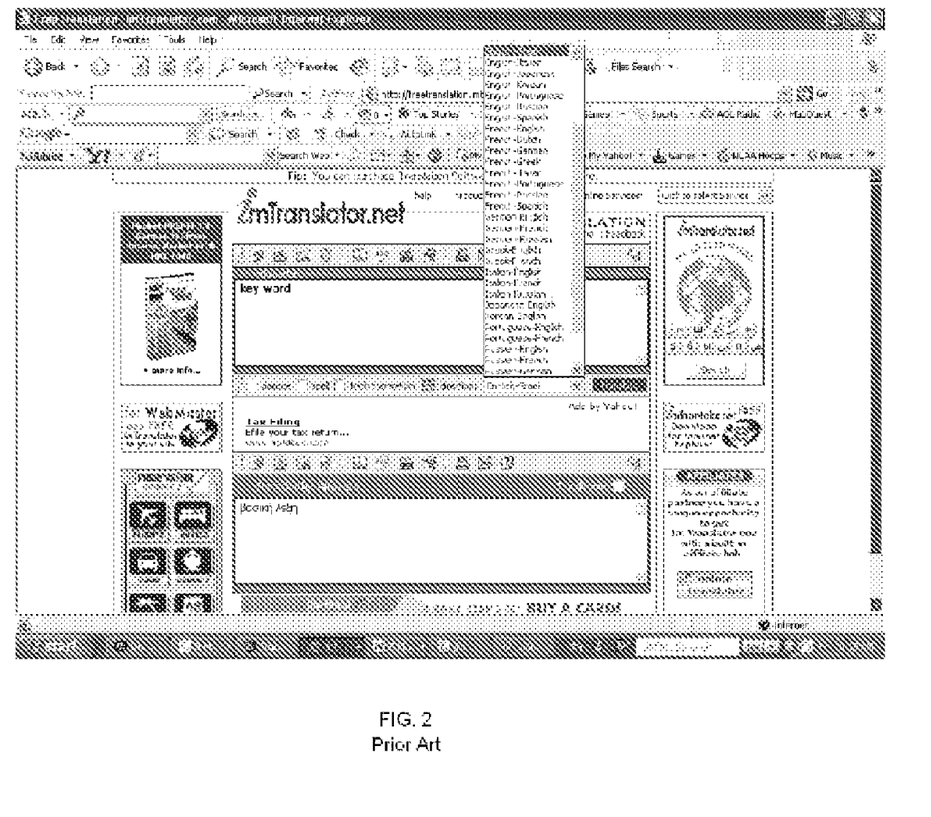
FIG. 2 is a screen shot of a typical translation Web page for Freetranslation.imtranslator.com illustrating the prior art.

FIG. 2 illustrates prior art translator web site "Freetranslation.imtranslator.com™" which permits a user to enter into a window field a word to be translated and then select the language pair to perform the translation. Once selected, there is provided a translation of the word.

The information retrieval function software 21 accesses the user-entered key word data 18A, the geographic search area data 18B, the translation pair data 18C and the reference source data 18D to pre-populate, but also restrict the retrieved information data 30 to the particular geographical area data 18B and to search, process, rank and sort related information stored in one or more data bases in accordance with the translation pair data 18C, the geographic search area data 18B and optionally the reference source data 18D, and then transmit the accessed related information data 30 to the user.

Current backbone technology and software can be employed to facilitate the implementation of the invention. This can be accomplished using algorithms and data structures familiar to the art. For example, to find words within phrases, the information retrieval function uses pointers as known in the art. The retrieved information data is analyzed for relevancy using various criteria including, but not limited to, the geographical area hit, word hit, part word hit, etc., with each hit accumulating to a score in a relevancy and sorting algorithm. Other ranking systems can also be added to the invention and various types of information retrieval are encompassed by the present invention.

Web site integration is accomplished by installing executable script (e.g., JavaScript™) on all web pages of the site to link and enable the information retrieval function. Most web pages (or parts there of) of the site will be generated by another integration of technologies including but not limited to MySQL, PHP, and Smarty. The generated web pages, with their executable scripts will be used to link and enable the information retrieval functions. A right-click of highlighted text using a mouse can be used to activate a pop-up menu for user selection of one or more of the above described functionalities.

Figure 3:
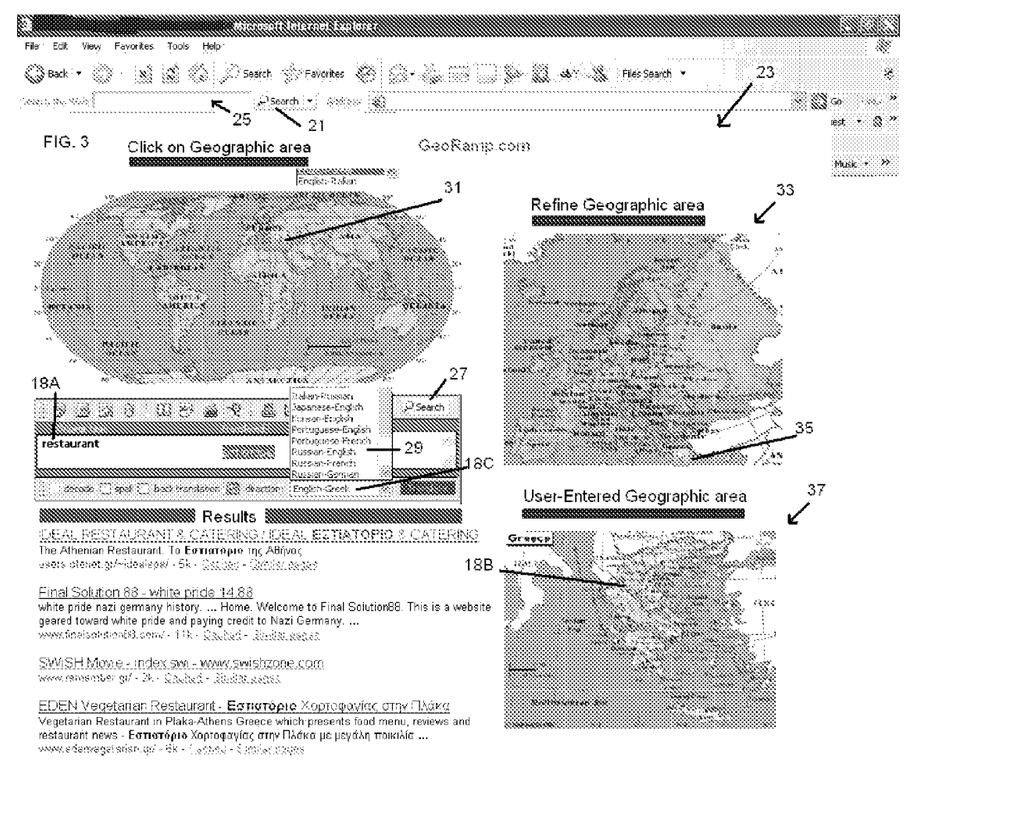
FIG. 3 is a screen shot of according to the present invention.
Figure 5:
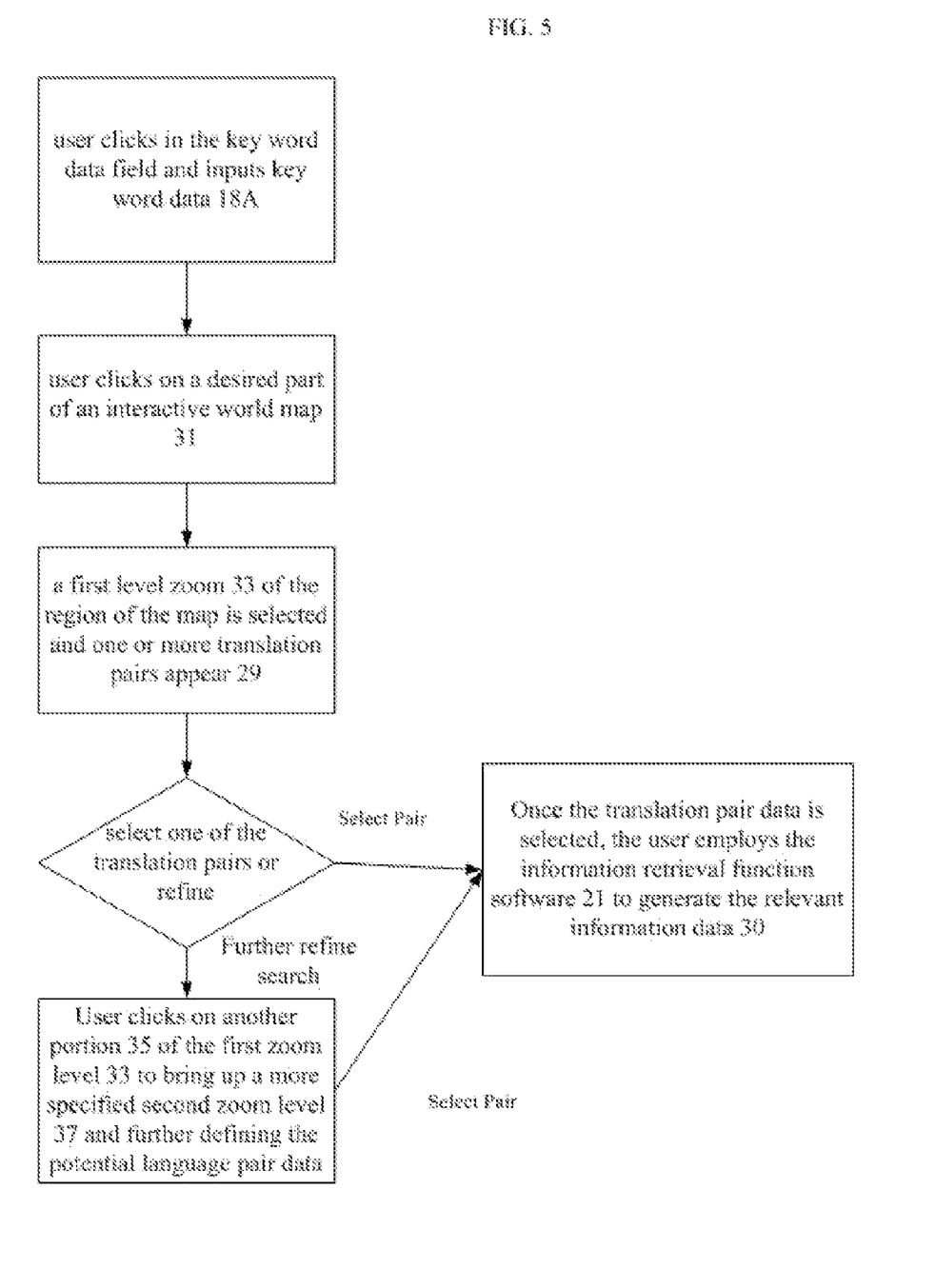
FIG. 5 is a flow chart schematic of an embodiment of the invention.

For example, FIG. 5 shows a flow diagram of the inventive method steps associated with the server-side Web page-integrated embodiments shown in FIG. 3. The user can click in the key word data field and input key word data 18A. The user can use the mouse to click on a desired part of an interactive world map 31. This brings up a first level zoom 33 of the region of the map selected. At this point, one or more translation pairs can appear 29. If more than one, the user can click on one of language pairs or click on another portion 35 of the first zoom level 33 to bring up a more specified second zoom level 37 and further defining the potential translation pair data. This enables sorting not only by language, but also by country, for example, Spanish speaking countries, French speaking countries, English speaking countries, etc. are geographically spaced across the world and if a user is looking for restaurants in Paris, and simply entered the translation and searched, many restaurants in Canada and potentially New Orleans might appear. Once the translation pair data is selected, the user can employ the information retrieval function software 21 to generate the relevant information data 30. By using the geographic search area data 18B, the program 26 enables the user to quickly narrow the relevant search information to the desired geographic region.

The invention can be employed on the 16 client using a downloadable browser "plug-in" that facilitates linking to the above-described information retrieval function software 21. A user can then use the method on any provider-driven Web site, regardless of whether or not a server has been integrated into the provider-driven Web site.

The present invention addresses this need by creating a software (herein described as GeoRamp.com) able to efficiently allow for "on-line" acquisition of information geographically relevant information (e.g., geographical significance, translation and dictionary look-ups) related to user-selected text. In preferred embodiments, as described above, the invention is implemented as an integrated method on the server-side, requiring little, if any client-side processing. Thus, a consumer can access the Internet using a computer or electronic hand-held device. The software program of the present invention is usable over a network, preferably over the Internet, and most preferably over the World Wide Web ("Web").

The system of the present invention encompasses a computer network comprising a server, at least one user (client) subsystem connected to the server via a network connecting means (e.g., user modem). Although referred to as a modem, the user modem can be any other communication means that enables network connection including public telephone land lines, dedicated data lines, cellular links, microwave links, or satellite communication.

The server can include one or more essentially a high-capacity, high-speed computers that include a processing unit connected to one or more relatable data bases or content sources, comprising, for example, electronic dictionaries, thesauruses, encyclopedias, digital images, multi-media content (e.g., sound and video, streaming video). Such content may comprise data corresponding to a variety of languages and character sets. Additional databases are optionally added to the server. Also connected to the processing unit is sufficient memory and appropriate communication hardware. The memory can be a separate, but connected component. The communication hardware may be modems, Ethernet connections, or any other suitable communication hardware. Although the server can be a single computer having a single processing unit, it is also possible that the server function could be spread over several networked computers, each having its processor and having one or more databases resident thereon. In particular embodiments of the present invention the server can be WAP-based server of a wireless network (see "Wireless Device Applications," below).

In addition to the elements described above, the server further comprises an operating system and communication software allowing the server to communicate with other computers. Various operating systems and communication software may be employed. For example, the operating system may be Microsoft Windows NT™, and the communication software Microsoft IIS™ (Internet Information Server) server with associated programs.

According to the present invention, the server is connected to the network, wherein the server comprises a processor, a memory, and a storage device, and wherein the processor and memory are operative with a program (e.g., herein referred to as GeoRamp™) stored on the storage device to perform the method described above. The software program of the present invention can be implemented as a stand-alone program on a particular Web site provider's server. Alternatively, the software may be implemented on an independent server that is linked to the provider's server.

The databases on, or connected to the server, contain the information necessary to make the inventive system and method work. The information retrieval databases of the present invention are relational, and are assembled and accessed using any commercially-available database software, such as MySql™, Oracle™, Sybase™, Informix™, etc., and other search engine technologies and algorithms as described herein above.

A user (client) subsystem generally includes a processor attached to storage unit, a communication controller, and a display controller. The display controller runs a display unit through which the user interacts with the subsystem. In essence, the user subsystem is a computer able to run software providing a means for communicating with the server. This software, for example, is an Internet web browser such as Microsoft Internet Explorer, Netscape Navigator, or other suitable Internet web browsers. The user subsystem can be a computer or hand-held electronic device, such as a telephone or wireless telephone or other PDA-type device that enables Internet access.

Such related information, as described herein above, comprises high quality multi-lingual translations, explanations, illustrations and/or consolidated automatic multi-dictionary definitions ("look-ups"), wherein such information is displayed to the user in text, voice, image or multi-media formats that correspond, or are at least compatible with the user's device, and with the user's native language or character set. Additionally, integration of reference and/or result windows and fields increases the number site page views, thus providing more advertising revenue. The present invention will enhance revenue by increasing sales to other language speakers, because such users will be enabled to navigate the Web site and educate themselves about the products in their own languages to make informed transactional decisions. Furthermore, the present invention provides a novel method to collect business intelligence and understand foreign markets, based on the words translated and/or on which products or related information are selectively accessed by particular language groups.

A person skilled in the art will, however, recognize that many additional embodiments are encompassed within the scope of the present invention. In particular, other embodiments are possible that incorporate additional or different art-recognized features and that apply to additional types and formats of retrievable information. What is claimed is:

The invention claimed is:

1. A method which provides a more effective web searching, which includes the steps of:
   (a) operably associating program software with a computer based device which is operably connected to an Internet, wherein the program software a predefined map of a world in a click on geographic area of a screen and enables a user to select a particular geographic area data of the map, said program software further providing said map to be interactive which allows said user to click on a desired part of said map to render a first zoom level and zoom in on said screen a part of said clicked map to a refine geographic area whereby a translation language pair data is generated corresponding to said selected particular geographic area data and said screen further provides a key word data field and enables the user to input through the computer based device query key word data into said key word data field which is accessible by an information retrieval function of said program software corresponding to said translation language pair data, and
   (b) providing a reference data source associated with said translation language pair data for enabling translation of said query key word data into a translated query key word data, whereby said translated query key word data is accessible by said information retrieval function in a manner to retrieve information data over the Internet as a function of said translation language pair data and said selected particular geographic area data to form a new customized map and display said new map in a user entered geographic area on said same screen.

2. The method of claim 1, wherein the program software includes search engine software.

3. The method of claim 2, wherein the search engine software is integrated into a server-side web site.

4. The method of claim 2, wherein the search engine software is integrated into a client-side web browser.

5. The method of claim 1, wherein said program software includes means for ranking said information data according to relevancy.

6. The method of claim 1, which is further characterized such that said program software provides that if more than one said translation language pair is generated for said selected particular geographic area, said program software provides for the user click on one of said language pairs or click on another portion of the first zoom level to bring up a more specified second zoom level and further defining said translation language pair.

7. A method over a wide area network including a server and a client, for client-directed acquisition of information relating to client-entered text data, comprising:
(a) employing a computer based device having program software operably associated therewith for displaying a predefined map of a world in a click on geographic area of a screen and enabling the client to select a particular geographic area data of the map, said program software further providing said map to be interactive which allows a user to click on a desired part of said map to render a first zoom level and zoom in on said screen a part of said clicked map to a refine geographic area whereby a translation language pair data is generated to the client corresponding to said selected particular geographic area data and said screen further provides a text data field and enables the user to input through the computer based device query text into said text data field which is accessible by an information retrieval function of said program software corresponding to said translation language pair data to form a new customized map and display said new map in a user entered geographic area on said same screen;
(b) receiving client-entered query text data in a first language;
(c) receiving client selected geographic area data;
(d) generating a translation language pair data including the first language and a second language corresponding to said selected geographic area data and having an associated translation reference source data for such language pair;
(e) translating said query client-entered text data into the second language using said translation reference data source to provide translated text data;
(f) accessing over the network information relating to said translated text data;
(g) translating said accessed information into the first language; and
(h) transmitting to the client said accessed information data for displaying on said screen.

8. The method of claim 7, which method further comprises an Internet search engine operatively associated with the server for accessing the information over the Internet.

9. The method of claim 7, wherein said program software includes means for ranking said information data according to relevancy.

10. The method of claim 7, which is further characterized such that said program software provides that if more than one said translation language pair is generated for said selected particular geographic area, said program software provides for the user click on one of said language pairs or click on another portion of the first zoom level to bring up a more specified second zoom level and further defining said translation language pair.

11. A system for user-directed acquisition over a wide area network, comprising:
a client computer;
a database having information data relating to user-entered text of HTML pages; and
a server computer having a processor, a memory, and a storage device, and wherein the processor and memory are operative with a program software stored on the storage device for displaying a predefined map of a world in a click on geographic area of a screen and enables the client computer to select a particular geographic area data of the map, said program software further providing said map to be interactive which allows a user to click on a desired part of said map to render a first zoom level and zoom in on said screen a part of said clicked map to a refine geographic area whereby a translation language pair is generated to said client computer corresponding to said selected particular geographic area data and said screen further provides a word data field to receive a client computer entered word data in a first language from said client computer, to receive selected geographic area data from said client computer, and wherein said program software is associated with software for translating said client word data in accordance with the language corresponding to said selected geographic search area data to provide translation word data to form a new customized map and display said new map in a user entered geographic area on said same screen, said program software further accesses said information data as a function of said translated word data, and transmits the accessed information data to said client computer.

12. The system of claim 11, which method further comprises an Internet search engine operatively associated with said server computer for accessing the information over the Internet.

13. The system of claim 11, wherein said program software includes means for ranking said information data according to relevancy.

14. The system of claim 11, which is further characterized such that said program software provides that if more than one said translation language pair is generated for said selected particular geographic area, said program software provides for the user click on one of said language pairs or click on another portion of the first zoom level to bring up a more specified second zoom level and further defining said translation language pair.

15. A system for enhanced communication over a network, comprising:
a local computer; and
remote computer having program software operably associated with said local computer for displaying a predefined map of a world in a click on geographic area of a screen and enables said local computer to select a particular geographic area data of the map, said program software further providing said map to be interactive which allows a user to click on a desired part of said map to render a first zoom level and zoom in on said screen a part of said clicked map to a refine geographic area whereby a translation language pair is generated to said local computer corresponding to said selected particular geographic area data and said screen further provides a word data field and for enabling said user-entered word data in a first language from said local computer for translating said user-entered word data in accordance with the language corresponding to said user selected geographic area data to provide translation word data to form a new customized map and display said new map in a user entered geographic area on said same screen, and for accessing information data as a function of said translated word data and for transmitting said accessed information data to said local computer.

16. The system of claim 15, which is further characterized such that said program software provides that if more than one said translation language pair is generated for said selected particular geographic area, said program software provides for the user click on one of said language pairs or click on another portion of the first zoom level to bring up a more specified second zoom level and further defining said translation language pair.

* * * * *